356-138.
08-15-72    OR    3,684,380

United States Patent
Benchley, Jr.

[15] 3,684,380
[45] Aug. 15, 1972

[54] NAVIGATIONAL AID COMPRISING TWO MIRRORS MOUNTED AT PREDETERMINED ANGULAR RELATIONSHIP FOR REVERSE DIRECTION OBSERVATION

[72] Inventor: Robert Benchley, Jr., 9 Seagate Rd., Noroton, Conn. 06820

[22] Filed: Nov. 27, 1970

[21] Appl. No.: 93,358

[52] U.S. Cl. ................356/138, 350/301, 356/254
[51] Int. Cl. .........................G02b 27/32, G01c 1/02
[58] Field of Search.............33/64 R, 46 AT, 46 AS; 356/254, 255; 350/174, 299, 301, 302; 351/50

[56]         References Cited

UNITED STATES PATENTS 2,374,956    5/1945    Rubissow..........33/46 AS UX

FOREIGN PATENTS OR APPLICATIONS 556,338    2/1957    Italy

*Primary Examiner*—Ronald L. Wibert
*Assistant Examiner*—Orville B. Chew, II
*Attorney*—Alfred W. Barber

[57]         ABSTRACT

Two-way vision mirrors comprising two mirrors mounted at right angles are provided with two indicator lines which when visually aligned provide sights 180° apart.

In order to determine a craft's position at sea by visual methods the pilot must be able to take relative bearings on landmarks or other aids to navigation when the ship is heading on a known course. If the object to be sighted is not too far from one side of the bow or the other and is ahead the pilot can sight "over the compass" and get a simultaneous reading of the ship's heading and the object's relative bearing.

Next to knowing the ship's exact heading, the most important bearings are the reciprocal, those to the rear. However, it has not been possible hitherto for a lone pilot at a fixed position, with the compass in full view, to obtain simultaneous bearings ahead and astern.

9 Claims, 8 Drawing Figures

PATENTED AUG 15 1972 3,684,380

INVENTOR.
ROBERT BENCHLEY, JR.
BY
Alfred W. Barber
ATTORNEY

INVENTOR.
ROBERT BENCHLEY, JR.
BY
Alfred W. Barber
ATTORNEY

NAVIGATIONAL AID COMPRISING TWO MIRRORS MOUNTED AT PREDETERMINED ANGULAR RELATIONSHIP FOR REVERSE DIRECTION OBSERVATION

SUMMARY

The present invention comprises a simple and effective device whereby a single navigator can readily determine forward and aft bearings simultaneously from a single location as at the compass provided only that vision to the rear is unobstructed. A novel two-way mirror combination makes this possible as will be shown in detail below.

In its preferred form the present invention comprises two mirrors joined end to end or mounted to another member so that they form a 90° angle to each other. A vertical line is marked on each mirror (preferably on the mirrored surface, to avoid a double image) equidistant from the intersection of the two mirrors. See lines 1 and 2 on mirrors 4 and 6 respectively in FIGS. 1 and 2.

Figure 1:
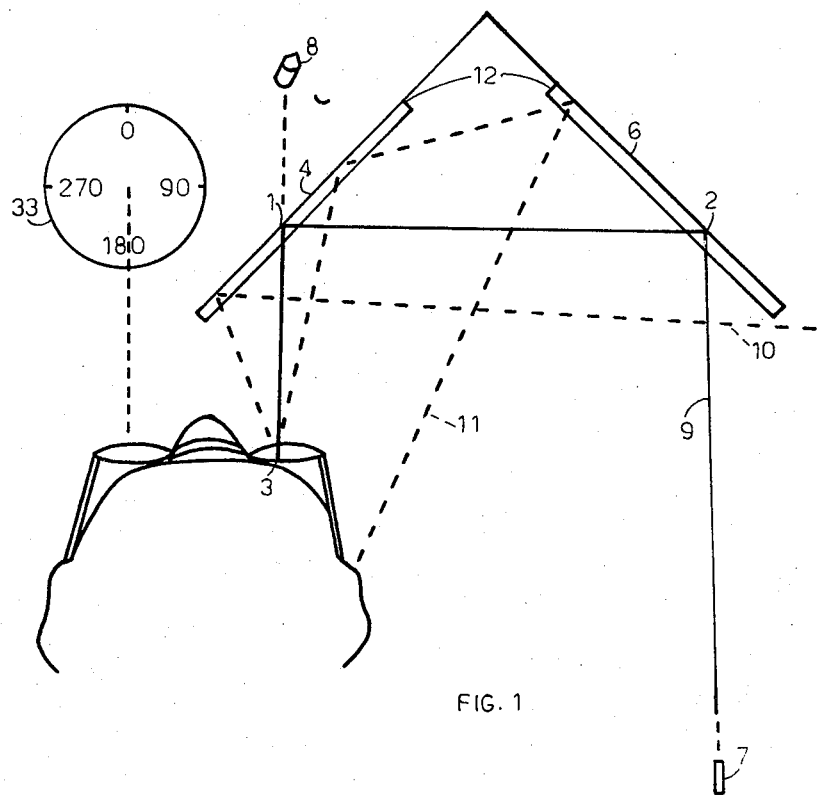
FIG. 1 is a plan view (diagramatic representation) of the preferred form of the present invention.
Figure 2:
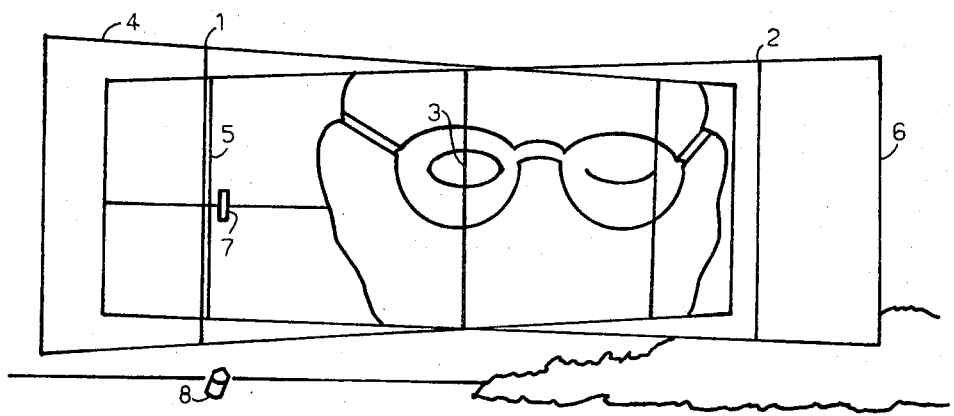
FIG. 2 is the view obtained by a pilot looking into the mirrors.

FIGS. 1 and 2 show how looking through his right eye 3 (it could be his left eye) the pilot moves his head until the line 1 on the left-hand mirror 4 lines up with the reflection 5 of line 2 on the right-hand mirror 6. He then knows that any object 7 that lies behind overlapping lines 1 and 5 is 180° in reverse of his direct line of vision as to object 8. If the device has been mounted directly above or behind the compass, he only has to move his eye down a few degrees to get an accurate and almost instantaneous bearing from the compass.

FIG. 2 shows what the pilot would see if the two mirrors 4 and 6 were long enough to actually meet at the apex. It shows that the useful portions of the mirrors must be far enough apart so that the reflection of the pilot's head does not obscure his view. For purposes of clarification FIG. 2 does not depict a true alignment of the buoys and lines. If the pilot were to move his head slightly to the left line 1 would obscure line 5 and a portion of buoy 7 astern. Buoy 8 however would then lie directly below the two lines. FIG. 1 is a top view which further explains the lines of sight. The solid line 9 shows the pilot is looking dead astern when he has aligned lines 1 and 2, and his head does not obscure his rear vision. The mirrors 4 and 6 need be no longer than shown in FIG. 1 for the following reason: keeping his head in the same position, if the navigator were to sight to the left along dotted line 10 he would be looking beyond the useful area of mirror 6, and if he looked to the right along dotted line 11 he would see his own head. For this reason the atea 12 between the two mirrors can be used for the tilting mechanisms to be described later.

Figure 3:
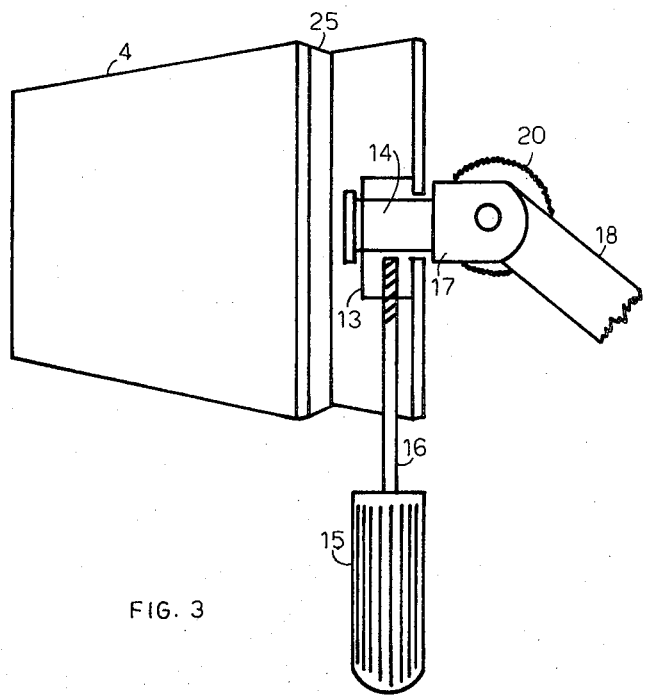
FIG. 3 is a view of a pivoted mounting for the mirrors.

In order to make the device more useful under rough sea conditions it can be pivoted in two planes, one for roll and one for pitch. In FIG. 3 one possible form is shown. The mirrors are attached to a member 13 (see FIG. 8) which is free to rotate around a stud 14 until a handle 15 with a threaded rod 16 is turned to lock the device in any desired position. To the rear end of the stud 14 is attached a U-shaped member 17 which surrounds a supporting bracket 18 and is free to turn about it until tightened by handle 20.

In some cases it might be practical to have the entire unit permanently attached above or near the compass, but usually it is best to be able to remove or collapse it out of the pilot's way.

Figure 5:
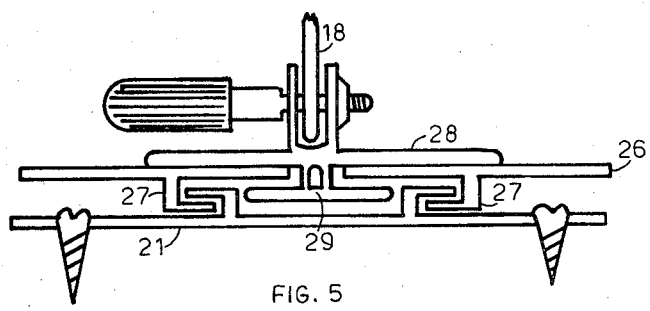
Figure 6:
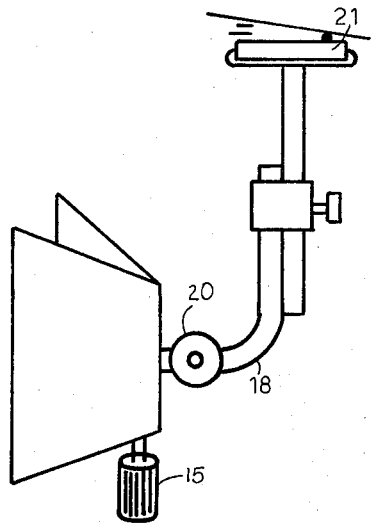
FIG. 6 is a side view of a mounting permitting height adjustment.

FIG. 6 shows a modification which can be raised up or down to the desired height when in use, or slid out of its permanently attached (and properly shimmed and aligned) bracket 21 for storage. (See also FIGS. 4 and 5 for details of permanent bracket).

Figure 7:
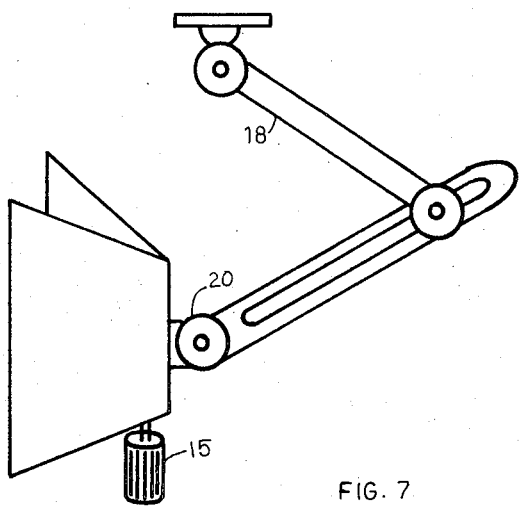
FIG. 7 is a view of another adjustable mounting.

FIG. 7 shows a more elaborate linkage that allows greater flexibility for mounting in awkward locations. Although both FIGS. 6 and 7 show an overhead mounting position, both can be reversed for mounting near the compass or on the windshield.

Figure 8:
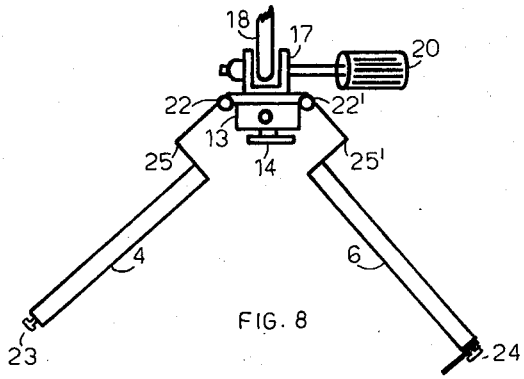
FIG. 8 is a top view of another method of mounting the mirrors.

Although FIGS. 6 and 7 show how the device can be partially collapsed, FIG. 8 shows an additional modification. Instead of having the two mirrors permanently set at 90° to each other their supporting members 22 and 22' are hinged and offset at 25 and 25' in such a manner that they can be closed together and locked by a locking device at 23 and 24.

Figure 4:
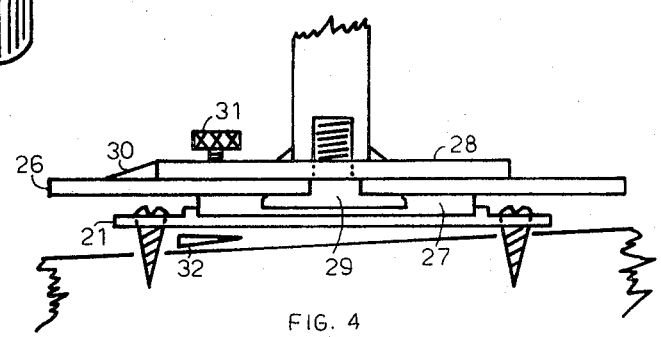
FIG. 4 and 5 are details of the mounting permitting 360° rotation.

Although all of the aforementioned modifications have been based on the assumption that the mirror is band-held or that the permanent supporting bracket must be aligned fore-and-aft, additional advantages can be realized if the entire assembly can be rotated 360° with respect to the bracket. FIGS. 4 and 5 show such a modification. A circular plate 26 of sufficient size to show calibrations of 360° on its upper surface has runners or flanges 27 to engage the permanent bracket 21. The plate, therefore, is always stationary with its 0° and 180° marks on the ship's lubber line. The entire mirror assembly, however, is free to rotate in a hole pierced in the center of circular plate 26. A smaller disc 28 and threaded flat-headed stud 29 hold the assembly in a vertical position while it is being rotated. A pointer 30 and a set-screw 31 allow the mirrors to be turned to any desired relative bearing and when tightened in place. FIG. 4 shows a side view of such a rotatable assembly when used with a rigid supporting member (see FIG. 6). It also shows how shims 32 can be placed under the permanent bracket 21. FIG. 5 shows a front view of a similar assembly when used with folding supporting member as shown in FIG. 7.

Since this twin mirror device is able to give two bearings at once, either the circular plate 26 can be calibrated with relative and reciprocal bearings, or the smaller disc 28 can have two pointers placed 180° apart.

Because of the great variation in ship construction more than one permanent bracket 21 may be needed; one at the helm for fore-and-aft bearings, one farther astern (but still in view of the compass) when structural members or other equipment might obscure the pilot's view, and a third on the flying-bridge when the ship has two control stations. Accurate shimming and alignment of all such permanent brackets will allow the pilot to switch the mirrors from one station to another with a minimum time for reinstallation.

I claim:

1. A navigational device including, in combination; means for holding said mirrors at a predetermined angle to each other and with their near edges spaced apart sufficiently to prevent an observer from seeing his own reflection;
and an index mark on each of said mirrors equidistant from the intersection of the projected planes of said mirrors which when viewed with one eye from one of said mirrors at a position where said marks are visually aligned provides a reflected view along a predetermined rearward direction.

2. A navigational device as set forth in claim 1; wherein said predetermined angle is substantially 90°.

3. A navigational device a set forth in claim 1; and including adjustable mounting means for said mirrors providing angle and tilt adjustments while maintaining said predetermined angle between said mirrors.

4. A navigational device including, in combination, two mirrors;
means for holding said mirrors at a predetermined angle to each other;
an index mark on each of said mirrors at predetermined positions such that viewed from one of said mirrors at a position where said marks are visually aligned provides a reflected view from the other of said mirrors along a predetermined rearward direction;
and including collapsible mounting means providing two preset positions;
one of said positions being with the mirrors at said predetermined angle;
and the other of said positions being a carrying position with said mirrors collapsed together face-to-face.

5. A navigational device as set forth in claim 1; and including a rotatable mounting for said mirrors.

6. A navigational device as set forth in claim 5; wherein said rotatable mounting includes means for indicating the angle of rotation.

7. A navigational device as set forth in claim 1; wherein said predetermined direction is substantially 180°.

8. A navigational device as set forth in claim 1; wherein said reflected view is substantially 180° from the direct view direction.

9. A navigational device as set forth in claim 1; wherein said holding means provides for holding said mirrors at said predetermined angle and also permits folding said mirrors toward each other into a compact face-to-face position.

* * * * *